(12) United States Patent
Park et al.

(10) Patent No.: US 7,992,057 B2
(45) Date of Patent: Aug. 2, 2011

(54) WRITE-ONCE TYPE OPTICAL DISC, AND METHOD AND APPARATUS FOR MANAGING DEFECTIVE AREAS ON WRITE-ONCE TYPE OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 12/318,901

(22) Filed: Jan. 12, 2009

(65) Prior Publication Data

US 2009/0122667 A1     May 14, 2009

Related U.S. Application Data

(63) Continuation of application No. 11/477,920, filed on Jun. 30, 2006, now Pat. No. 7,489,604.

(30) Foreign Application Priority Data

Sep. 26, 2002 (KR) ............................ 10-2002-58515
Jan. 11, 2003 (KR) ............................ 10-2003-01856

(51) Int. Cl.
*G11C 29/00* (2006.01)
*G11B 20/18* (2006.01)
*G11B 7/24* (2006.01)

(52) U.S. Cl. .................. 714/710; 369/53.17; 369/275.3

(58) Field of Classification Search .................. 714/5, 6, 714/7, 8, 710, 723, 746; 369/47.14, 53.17, 369/53.15, 275.3

See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi et al. | |
| 4,807,205 A | 2/1989 | Picard et al. | |
| 4,963,866 A | 10/1990 | Duncan | |
| 5,068,842 A | 11/1991 | Naito et al. | |
| 5,111,444 A * | 5/1992 | Fukushima et al. | 369/53.17 |
| 5,210,734 A | 5/1993 | Sakurai et al. | |
| 5,235,585 A | 8/1993 | Bish et al. | |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

*Primary Examiner* — Jeffrey A Gaffin
*Assistant Examiner* — Daniel F McMahon
(74) *Attorney, Agent, or Firm* — Birch, Stewart, Kolasch & Birch, LLP

(57) ABSTRACT

A recording medium and a method and apparatus for managing a defective area on the recording medium are provided. The method includes detecting an existence of a defective area within the data area of the recording medium; replacing the defective area with a replacement area in the spare area if the defective area is detected; writing in the spare area defect management information which cumulatively includes defect list information associated with the defective area detected in the step (a) and any defect list information previously written in the recording medium; and writing onto the recording medium positional information of the defect management information.

19 Claims, 12 Drawing Sheets

U.S. PATENT DOCUMENTS

| | | | |
|---|---|---|---|
| 5,237,553 A | 8/1993 | Fukushima et al. | |
| 5,247,494 A | 9/1993 | Ohno et al. | |
| 5,319,626 A | 6/1994 | Ozaki et al. | |
| 5,404,357 A | 4/1995 | Ito et al. | |
| 5,442,611 A | 8/1995 | Hosaka et al. | |
| 5,448,728 A | 9/1995 | Takano et al. | |
| 5,475,668 A * | 12/1995 | Azumatani et al. | 369/47.14 |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,497,361 A * | 3/1996 | Mita et al. | 369/47.18 |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,666,335 A | 9/1997 | Horibe | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A | 2/1999 | Miyamoto et al. | |
| 5,878,020 A | 3/1999 | Takahashi et al. | |
| 5,914,928 A | 6/1999 | Takahashi et al. | |
| 5,940,702 A | 8/1999 | Sakao et al. | |
| 5,940,854 A * | 8/1999 | Green et al. | 711/112 |
| 6,031,804 A * | 2/2000 | Yamamuro | 369/47.14 |
| 6,058,085 A | 5/2000 | Obata et al. | |
| 6,089,455 A * | 7/2000 | Yagita | 235/454 |
| 6,118,608 A | 9/2000 | Kakihara et al. | |
| 6,118,737 A * | 9/2000 | Hutter | 369/30.12 |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,249,884 B1 | 6/2001 | Joo | |
| 6,249,888 B1 * | 6/2001 | Sasaki et al. | 714/710 |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko et al. | |
| 6,469,978 B1 * | 10/2002 | Ohata et al. | 369/275.3 |
| 6,477,126 B1 | 11/2002 | Park et al. | |
| 6,480,446 B1 | 11/2002 | Ko et al. | |
| 6,493,301 B1 * | 12/2002 | Park | 369/53.15 |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 * | 5/2003 | Kim et al. | 714/723 |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B2 | 8/2004 | Lee et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 * | 11/2004 | Brommer et al. | 369/94 |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0055012 A1 | 5/2002 | Chou et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0133485 A1 | 9/2002 | Furuhashi | |
| 2002/0136118 A1 | 9/2002 | Takahashi | |
| 2002/0136134 A1 | 9/2002 | Ito et al. | |
| 2002/0136537 A1 * | 9/2002 | Takahashi | 386/95 |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0103427 A1 | 6/2003 | Yeo et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |

| | | | | | | |
|---|---|---|---|---|---|---|
| 2005/0060489 | A1 | 3/2005 | Park | JP | 2000-90588 | | 3/2000 |
| 2005/0068877 | A1 | 3/2005 | Yeo | JP | 2000-149449 | A | 5/2000 |
| 2005/0083740 | A1 | 4/2005 | Kobayashi | JP | 2000-195178 | A | 7/2000 |
| 2005/0083767 | A1 | 4/2005 | Terada et al. | JP | 2000-215612 | | 8/2000 |
| 2005/0083830 | A1 | 4/2005 | Martens et al. | JP | 2000-285607 | A | 10/2000 |
| 2005/0195716 | A1 | 9/2005 | Ko et al. | JP | 2000-293948 | A | 10/2000 |
| 2005/0207262 | A1 | 9/2005 | Terada et al. | JP | 2001-023317 | A | 1/2001 |
| 2005/0289389 | A1 | 12/2005 | Yamagami et al. | JP | 2001-069440 | A | 3/2001 |
| 2006/0077827 | A1 | 4/2006 | Takahashi | JP | 2001-110168 | A | 4/2001 |
| 2006/0195719 | A1 | 8/2006 | Ueda et al. | JP | 2001-351334 | A | 12/2001 |
| 2006/0203635 | A1 | 9/2006 | Ko et al. | JP | 2001-357623 | A | 12/2001 |
| 2006/0203638 | A1 | 9/2006 | Ko et al. | JP | 2002-015507 | A | 1/2002 |
| 2006/0203684 | A1 | 9/2006 | Ko et al. | JP | 2002-015525 | A | 1/2002 |
| 2006/0227694 | A1 | 10/2006 | Woerlee et al. | JP | 2002-056619 | A | 2/2002 |
| 2007/0294571 | A1 | 12/2007 | Park et al. | JP | 2002-215612 | A | 8/2002 |
| 2008/0046780 | A1 | 2/2008 | Shibuya et al. | JP | 2002-245723 | A | 8/2002 |
| 2008/0279073 | A1 | 11/2008 | Gotoh et al. | JP | 2002-288938 | A | 10/2002 |
| | | | | JP | 2002-329321 | A | 11/2002 |
| | | | | JP | 2002-352522 | A | 12/2002 |
| FOREIGN PATENT DOCUMENTS | | | | JP | 2003-536194 | A | 12/2003 |
| CN | 1140897 | C | 1/1997 | JP | 2004-527436 | T | 9/2004 |
| CN | 1227950 | A | 9/1999 | JP | 2004-280864 | A | 10/2004 |
| CN | 1273419 | A | 11/2000 | JP | 2004-280865 | A | 10/2004 |
| CN | 1342314 | A | 3/2002 | JP | 2005-004912 | A | 1/2005 |
| CN | 1675708 | A | 9/2005 | JP | 2005-535993 | A | 11/2005 |
| CN | 1685426 | A | 10/2005 | JP | 2005-538490 | A | 12/2005 |
| DE | 199 54 054 | A1 | 6/2000 | JP | 2005-538491 | A | 12/2005 |
| EP | 0314186 | A2 | 5/1989 | JP | 2006-519445 | A | 8/2006 |
| EP | 0325823 | A1 | 8/1989 | KR | 10-2000-0018533 | A | 4/2000 |
| EP | 0350920 | A2 | 1/1990 | KR | 10-2000-0032046 | | 6/2000 |
| EP | 0464811 | A2 | 1/1992 | KR | 10-2000-0033285 | A | 6/2000 |
| EP | 0472484 | A2 | 2/1992 | KR | 10-2002-0087483 | A | 11/2002 |
| EP | 0477503 | A2 | 4/1992 | KR | 1020040015602 | | 11/2004 |
| EP | 0556046 | A1 | 8/1993 | RU | 2005 103 626 | | 9/2005 |
| EP | 0871172 | A2 | 10/1998 | RU | 2005 127 337 | | 2/2006 |
| EP | 0908882 | A2 | 4/1999 | TW | 371752 | | 10/1999 |
| EP | 0957477 | A2 | 11/1999 | TW | 413805 | | 12/2000 |
| EP | 0974967 | A1 | 1/2000 | TW | 448435 | B | 8/2001 |
| EP | 0989554 | A1 | 3/2000 | TW | 470946 | B | 1/2002 |
| EP | 0 997 904 | A1 | 5/2000 | TW | 497098 | B | 8/2002 |
| EP | 1026681 | B1 | 8/2000 | WO | WO-84/00628 | A1 | 2/1984 |
| EP | 1043723 | A1 | 10/2000 | WO | WO-96/30902 | A1 | 10/1996 |
| EP | 1 132 914 | A2 | 9/2001 | WO | WO-97/22182 | A1 | 6/1997 |
| EP | 1148493 | A2 | 10/2001 | WO | WO-00/54274 | A1 | 9/2000 |
| EP | 1152402 | A1 | 11/2001 | WO | WO-01/22416 | A1 | 3/2001 |
| EP | 1152414 | A2 | 11/2001 | WO | WO-01/93035 | A2 | 12/2001 |
| EP | 1239478 | A1 | 9/2002 | WO | WO 02/057195 | A1 | 7/2002 |
| EP | 1274081 | A2 | 1/2003 | WO | WO-03/007296 | A1 | 1/2003 |
| EP | 1298659 | A1 | 4/2003 | WO | WO-03/025924 | A1 | 3/2003 |
| EP | 1329888 | A1 | 7/2003 | WO | WO-03/079353 | A1 | 9/2003 |
| EP | 1347452 | A2 | 9/2003 | WO | WO-2004/015707 | A1 | 2/2004 |
| EP | 1547065 | | 6/2005 | WO | WO-2004/015708 | A1 | 2/2004 |
| EP | 1564740 | A1 | 8/2005 | WO | WO-2004025648 | | 3/2004 |
| EP | 1573723 | | 9/2005 | WO | WO-2004025649 | | 3/2004 |
| EP | 1612790 | A1 | 1/2006 | WO | WO-2004/029668 | A2 | 4/2004 |
| EP | 1623422 | | 2/2006 | WO | WO-2004/029941 | A1 | 4/2004 |
| GB | 2356735 | A | 5/2001 | WO | WO-2004/034396 | A1 | 4/2004 |
| JP | 63-091842 | A | 4/1988 | WO | WO-2004/036561 | A1 | 4/2004 |
| JP | 01-263955 | A | 10/1989 | WO | WO-2004/053872 | A1 | 6/2004 |
| JP | 2-23417 | A | 1/1990 | WO | WO-2004/053874 | A1 | 6/2004 |
| JP | 05-274814 | A | 10/1993 | WO | WO-2004/068476 | A1 | 8/2004 |
| JP | 06-349201 | A | 12/1994 | WO | WO-2004/015180 | A1 | 9/2004 |
| JP | 08-096522 | A | 4/1996 | WO | WO-2004/079731 | A1 | 9/2004 |
| JP | 09-145634 | A | 6/1997 | WO | WO-2004/079740 | A1 | 9/2004 |
| JP | 09-231053 | A | 9/1997 | WO | WO-2004/081926 | A1 | 9/2004 |
| JP | 10-050005 | A | 2/1998 | WO | WO-2004075180 | | 9/2004 |
| JP | 10-050032 | A | 2/1998 | WO | WO-2004079631 | | 9/2004 |
| JP | 10-187356 | | 7/1998 | WO | WO-2004/093035 | A1 | 10/2004 |
| JP | 10-187357 | | 7/1998 | WO | WO-2004/100155 | A1 | 11/2004 |
| JP | 10-187358 | | 7/1998 | WO | WO-2004/100156 | A1 | 11/2004 |
| JP | 10-187359 | | 7/1998 | WO | WO-2005/004123 | A1 | 1/2005 |
| JP | 10-187360 | | 7/1998 | WO | WO-2005/004154 | A2 | 1/2005 |
| JP | 10-187361 | A1 | 7/1998 | | | | |
| JP | 11-110888 | A | 4/1999 | * cited by examiner | | | |
| JP | 11-203792 | A | 7/1999 | | | | |

Single Layer BD-WO

Dual Layer BD-WO

WRITE-ONCE TYPE OPTICAL DISC, AND METHOD AND APPARATUS FOR MANAGING DEFECTIVE AREAS ON WRITE-ONCE TYPE OPTICAL DISC

This application is a Continuation of application Ser. No. 11/477,920, filed on Jun. 30, 2006 now U.S. Pat. No. 7,489,604, which claims priority to Korean Patent Application Nos. P2002-058515, filed on Sep. 26, 2002, and P2003-001856, filed on Jan. 11, 2003. The entire contents of each of all three applications are herein fully incorporated by reference.

BACKGROUND OF THE INVENTION

1. Field of the Invention

The present invention relates to an optical disc of write-once type, such as a Blu-ray Disc Write Once (BD-WO), and a method and apparatus for managing a defective area on the write-once type optical disc.

2. Background of the Related Art

A new type of high density optical disc such as a Blu-ray Disc Rewritable (BD-RE) is being developed. A benefit of the BD-RE is that it has a rewritable capability where the quality video and audio data can be written, erased and rewritten thereon repeatedly.

FIG. 1 is a block diagram of a general optical disc device for writing/reproducing data to/from an optical disc such as a BD-RE. As shown in FIG. 1, the optical disc device includes an optical pickup 11 for recording/reproducing a signal to/from a BD-RE 10, a video disc recorder (VDR) system 12 for processing a signal from the optical pickup 11 as a reproduced signal, or demodulating and processing an external data stream into a writable signal suitable for writing onto the BD-RE 10, and an encoder 13 for encoding an external analog signal and providing the encoded signal to the VDR system 12.

FIG. 2 shows a structure of a related art BD-RE. Referring to FIG. 2, the BD-RE is divided into a Lead-In Area (LIA), a data area, and a Lead-Out area (LOA), with an Inner Spare Area (ISA) and an Outer Spare Area (OSA) assigned to a fore end and a rear end of the data area.

Referring to FIGS. 1 and 2, the VDR system 12 of the optical disc device writes in the data area of the BD-RE the external data in clusters corresponding to an ECC block unit having a predetermined size of recording, after the VDR system 12 encodes and demodulates the external signal into a signal suitable for writing. During the writing process, if there is a defective area found in the data area of the BD-RE, the VDR system 12 carries out a series of replacement writing operations in which the clusters of data written onto the defective area is written onto one of the spare areas, e.g., on the ISA in place of the defective area. Therefore, even if there is a defective area in the data area of the BD-RE, the VDR system 12 can prevent a data writing error in advance by writing the clusters of data written in the defective area onto the spare area.

A Blu-ray Disc Write-Once (BD-WO) is another type of high density optical disc that is being developed where a high quality of data can be recorded and reproduced to/from the disc. As the name may suggest, data can be written only once on the BD-WO and is not rewritable on the BD-WO, but the BD-WO can be read repeatedly. As a result, the BD-WO is useful where the rewritability of data on a recording medium is not desired.

Unfortunately, since the BD-WO is still in the early development stage, there are no schemes, no disc structures, no apparatuses and no methods on how to manage the defective areas of the BD-WO, which will be needed for the BD-WO to be commercially viable and operationally feasible.

SUMMARY OF THE INVENTION

Accordingly, the present invention is directed to a technique for managing a defective area on an optical disc of write-once type such as a BD-WO.

An object of the present invention is to provide a write-once type optical disc, and an apparatus and method for effectively managing a defective area of the write-once type optical disc.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

According to an aspect of the invention, a method for managing a defective area on a recording medium of writable once type, the recording medium including a data area, includes (a) detecting an existence of a defective area within the data area of the recording medium once data are written onto the data area in a data writing operation; (b) writing data written in the defective area onto another area of the data user if the defective area is detected; and (c) writing, onto at least one defect management area on the recording medium, defect management information associated with the defective area.

According to another aspect of the invention, a method for managing a defective area on a recording medium of writable once type, the recording medium including a data area and a lead-in area, the data area including a spare area, includes (a) detecting an existence of a defective area within the data area of the recording medium after writing data onto the data area in a data writing operation; (b) writing data written in the defective area onto the spare area if the defective area is detected; and (c) writing, onto the lead-in area, defect list information associated with the defective area.

According to another aspect of the invention, a recording medium of writable once type, includes a data area including a recording area, a replacement area, and at least one defect management area, wherein an existence of a defective area within the data area of the recording medium is detected after data are written onto the recording area during a data writing operation, data written in the defective area are written onto the replacement area if the defective area is detected, and defect management information associated with the defective area is written onto the at least one defect management area.

According to another aspect of the invention, a recording medium of writable once type, includes a data area including a spare area; and a lead-in area, wherein an existence of a defective area within the data area of the recording medium is detected after writing data onto the data area in a data writing operation, data written in the defective area is written onto the spare area if the defective area is detected, and defect list information associated with the defective area is written onto the lead-in area.

According to another aspect of the invention, an apparatus for managing a defective area on a recording medium of writable once type, the recording medium including a data area, includes (a) a configured section for detecting an existence of a defective area within the data area of the recording medium once data are written onto the data area in a data writing operation; (b) a configured section for writing data written in the defective area onto another area of the data user if the defective area is detected; and (c) a configured section for writing, onto at least one defect management area on the recording medium, defect management information associated with the defective area.

According to another aspect of the invention, an apparatus for managing a defective area on a recording medium of writable once type, the recording medium including a data area and a lead-in area, the data area including a spare area, includes (a) a configured section for detecting an existence of a defective area within the data area of the recording medium after writing data onto the data area in a data writing operation; (b) a configured section for writing data written in the defective area onto the spare area if the defective area is detected; and (c) a configured section for writing, onto the lead-in area, defect list information associated with the defective area.

According to another aspect, the present invention provides a method for managing a defective area on a recording medium, the recording medium including a data area and a lead in area, the data area including at least one spare area, the method comprising: (a) detecting an existence of a defective area within the data area of the recording medium; (b) writing data written in the defective area onto a replacement area of the at least one spare area if the defective area is detected; and (c) writing defect management information associated with the defective area onto one of a plurality of defect management areas on the recording medium, wherein the defect management areas on the recording medium are allocated on the lead in area and within the at least one spare area of the recording medium.

According to another aspect, the present invention provides a recording medium comprising: a data area including a recording area and at least one spare area, each of the at least one spare area including a replacement area and a defect management area, and a lead in area including another defect management area, wherein if a defective area within the recording area is detected, data written in the defective area are written onto the replacement area within the at least one spare area, and defect management information associated with the defective area is written onto the one of the defect management areas within the at least one spare area and the lead in area.

According to another aspect, the present invention provides an apparatus for managing a defective area on a recording medium, the recording medium including a data area and a lead in area, the data area including at least one spare area, the apparatus comprising: a pickup for recording and reproducing the data on/from the recording medium; and a controller configured to control the pickup to detect an existence of a defective area within the data area of the recording medium, and to write data written in the defective area onto a replacement area of the at least one spare area if the defective area is detected, and to write defect management information associated with the defective area onto one of a plurality of defect management areas on the recording medium, wherein the defect management areas on the recording medium are allocated on the lead in areas and within the at least one spare area of the recording medium.

According to another aspect, the present invention provides a method for managing a defective area on a recording medium, the recording medium including a data area and a lead in area, the data area including a recording area and at least one spare area, the method comprising steps of: (a) detecting an existence of a defective area within the recording area of the recording medium; (b) writing data written in the defective area onto one of the at least one spare area if the defective area is detected; (c) allocating a defect management area within the recording area; and (d) writing defect management information associated with the defective area onto the allocated defect management area.

According to another aspect, the present invention provides an apparatus for managing a defective area on a recording medium, the recording medium including a data area and a lead in area, the data area including a recording area and at least one spare area, the apparatus comprising: a pickup for recording and reproducing the data on/from the recording medium; and a controller configured to control the pickup to detect an existence of a defective area within the recording area of the recording medium, and to write data written in the defective area onto one of the at least one spare area if the defective area is detected, and to allocate a defect management area within the recording area, and to write defect management information associated with the defective area onto the allocated defect management area.

According to another aspect, the present invention provides a recording medium comprising: a data area including a recording area and at least one spare area, wherein if a defective area within the recording area is detected, data written in the defective area are written onto the at least one spare area, and defect management information associated with the defective area is written onto a defect management area, the defect management area is allocated within the recording area; and a lead in area for writing disc definition structure information containing positional information of the defect management area allocated within the recording area.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
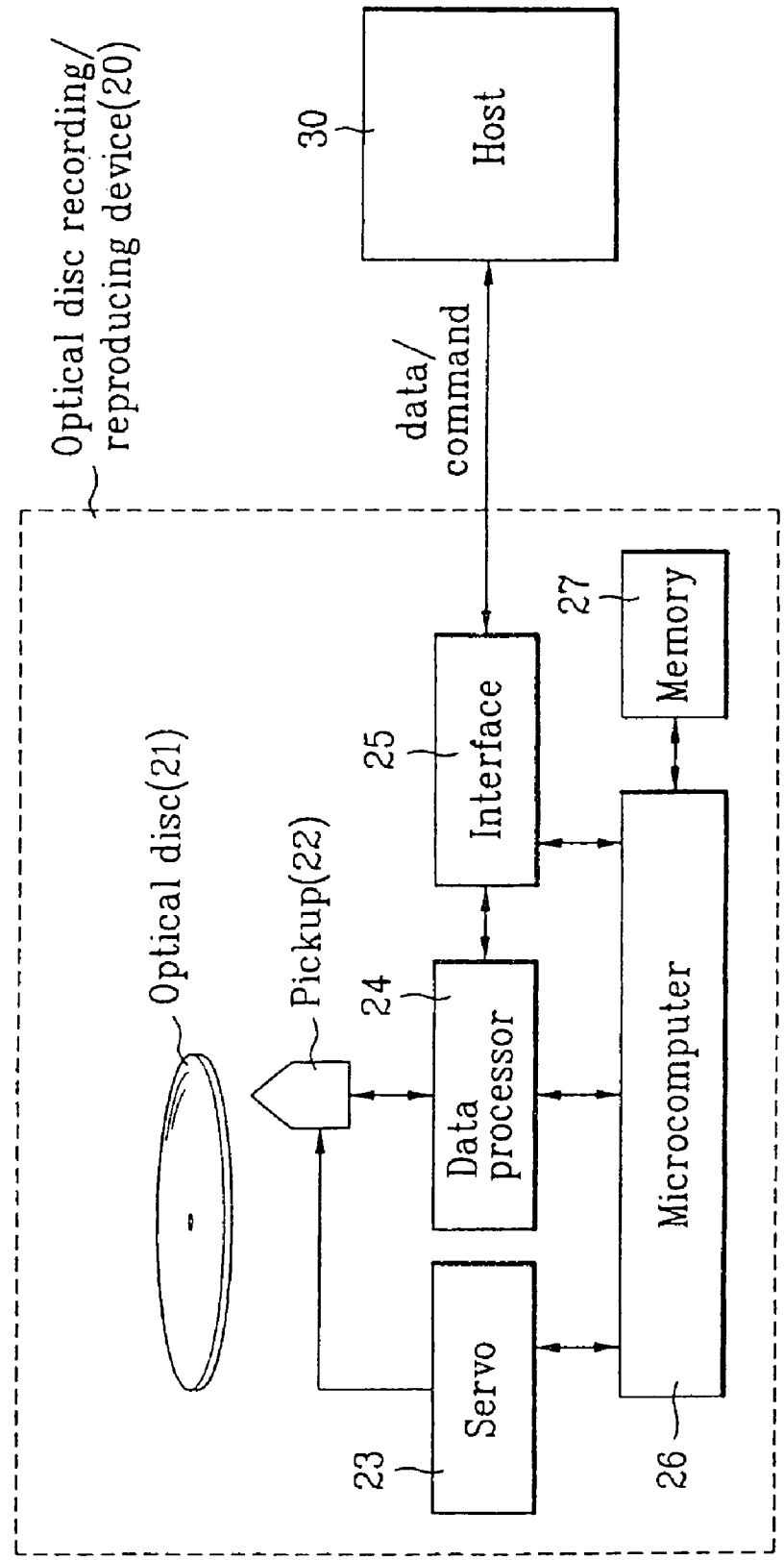
FIG. 3 illustrates a block diagram of an optical disc recording/reproducing device according to the present invention.

FIG. 3 is an example of a block diagram of an optical disc recording/reproducing device 20 according to an embodiment of the present invention. The optical disc recording/reproducing device 20 includes an optical pickup 22 for writing/reading data to/from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface for exchanging data and/or commands with any external host 30, a memory or storage 27 for storing information and data therein including defect management data associated with the recording medium 21, and a microprocessor or controller 26 for controlling the operations and elements of the recording/reproducing device 20. Data to be written/read to/from the recording medium 21 may also be stored in the memory 27. All the components of the recording/reproducing device 20 are operatively coupled.

The recording medium 21 is a recording medium of write-once type such as a BD-WO.

Figure 4A:
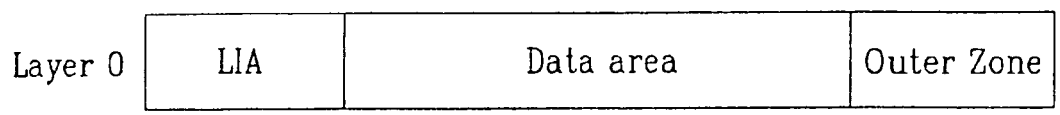
FIGS. 4A and 4B illustrate a structure of a single layer BD-WO and a dual layer BD-WO, respectively, according to an embodiment of the present invention.
Figure 4B:
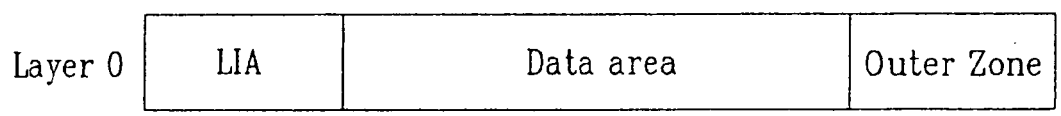
Figure 4B:
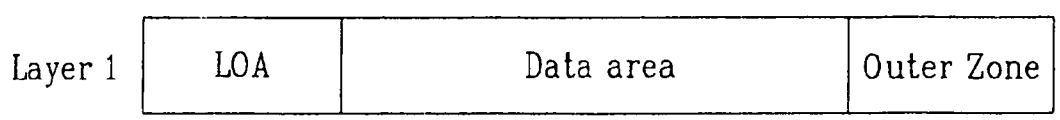

FIGS. 4A and 4B illustrate respectively a structure of two types of a write-once optical disc such as a BD-WO according to the present invention. As shown in FIGS. 4A and 4B, the BD-WO can have one or two recording layers. In FIG. 4A, a BD-WO having only a single recording layer (Layer 0) includes a single recording layer composed of a lead-in area (LIA), a data area, and a lead-out area (LOA), and is referred to herein as a single layer disc. In FIG. 4B, a dual layer BD-WO includes two recording layers (Layers 0 and 1). The first recording layer (Layer 0) includes a LIA, a data area, and an outer zone. The second recording layer (Layer 1) includes a LOA, a data area and an outer zone, and is referred to herein as a dual layer disc. Generally, a data writing occurs in the direction shown with the dotted arrow in the dual layer disc. The single layer disc can have a capacity of 23.3, 25.0 or 27.0 Gbytes, whereas the dual layer disc can have a capacity of 46.6, 50.0, or 54.0 Gbytes.

Figure 1:
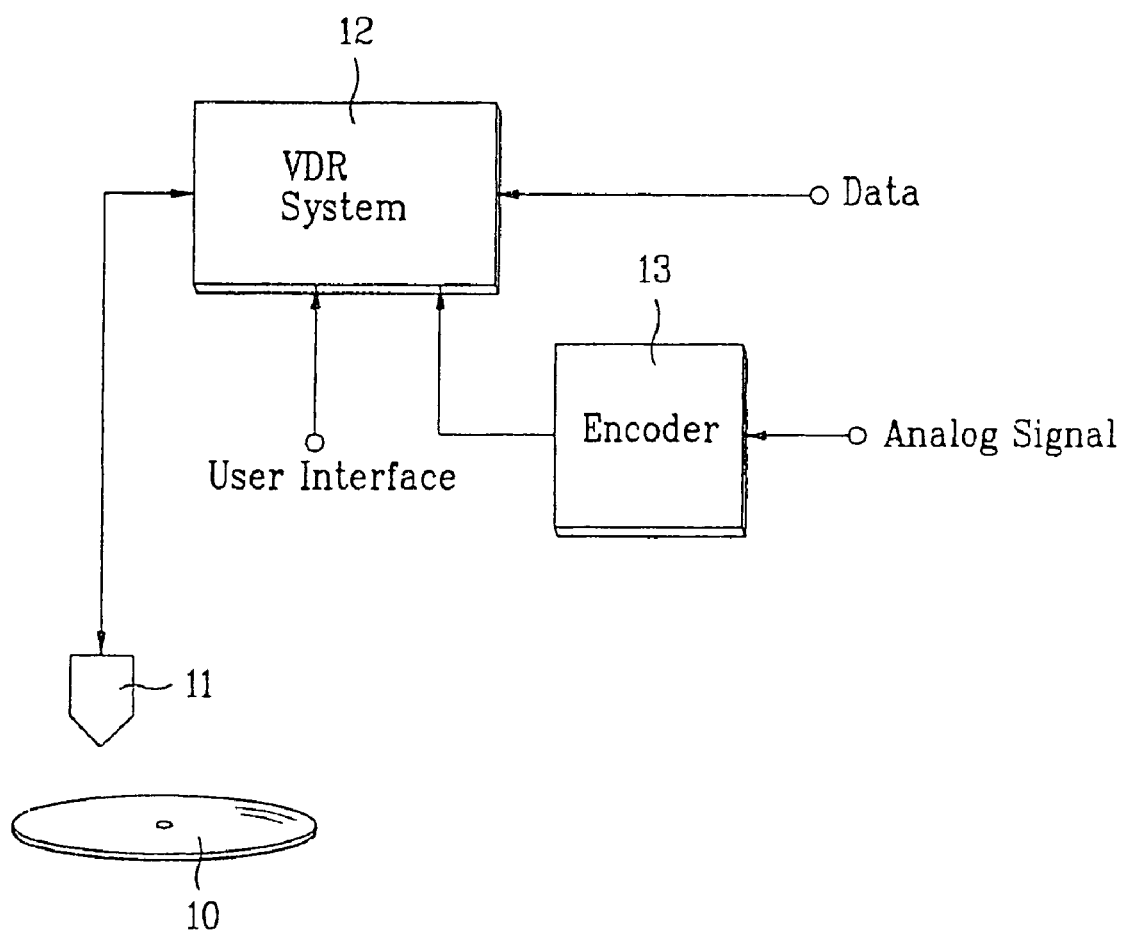
FIG. 1 illustrates a related art optical disc device schematically.
Figure 2:
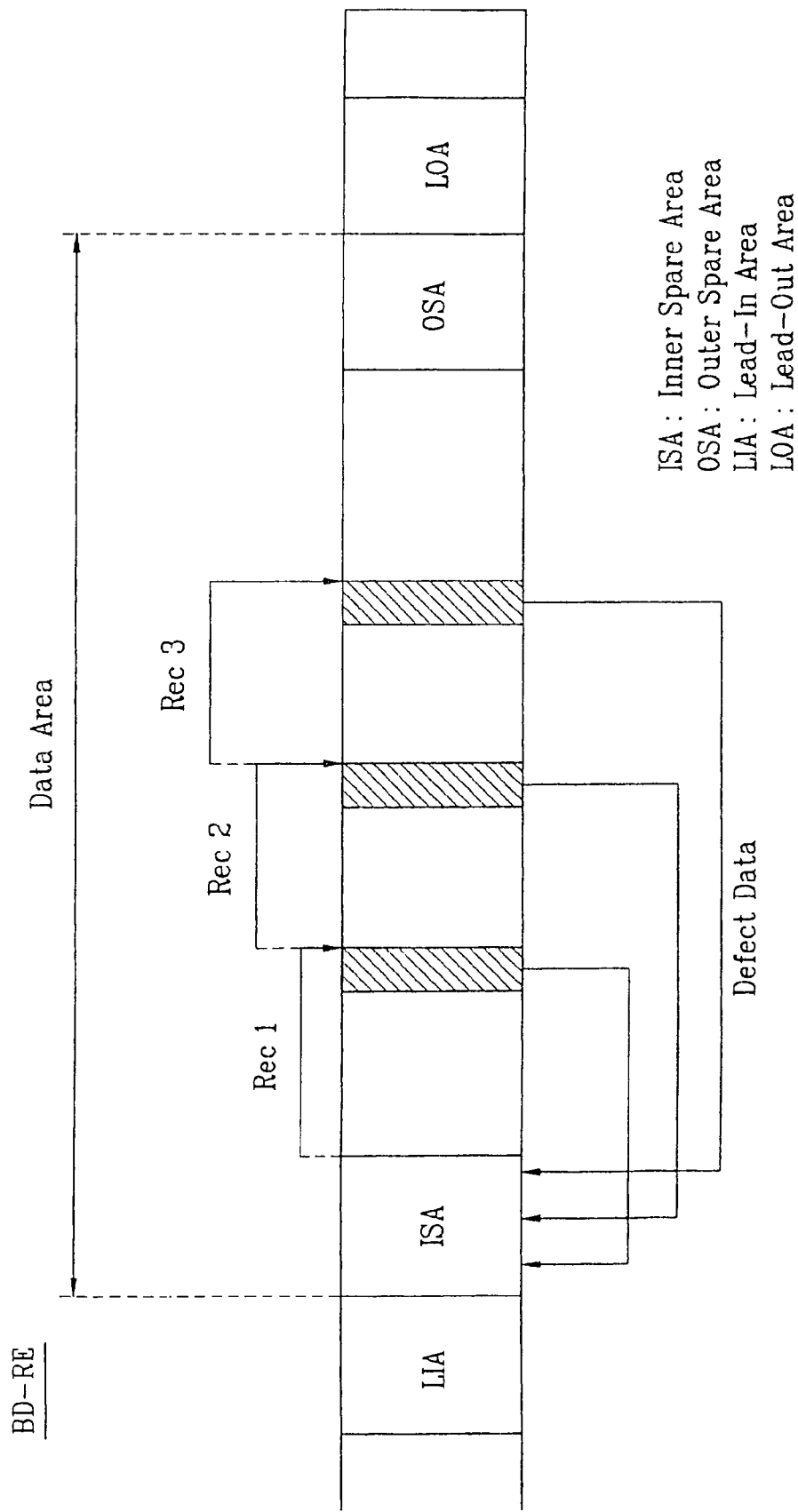
FIG. 2 illustrates a structure of a related art BD-RE.

It should be noted that all the different embodiments of the present invention (e.g., various methods discussed below) are applicable to any type of a write-once optical disc, such as a single layer BD-WO or a dual layer BD-WO. Further, although the use of the recording/reproducing device 20 of FIG. 3 is discussed below in conjunction with the methods of the invention, the invention is not limited to such and encompasses other recording/reproducing devices as long as they are configured to implement the present methods. For instance, the device shown in FIG. 1 may be used to implement the present methods as needed.

Figure 5:
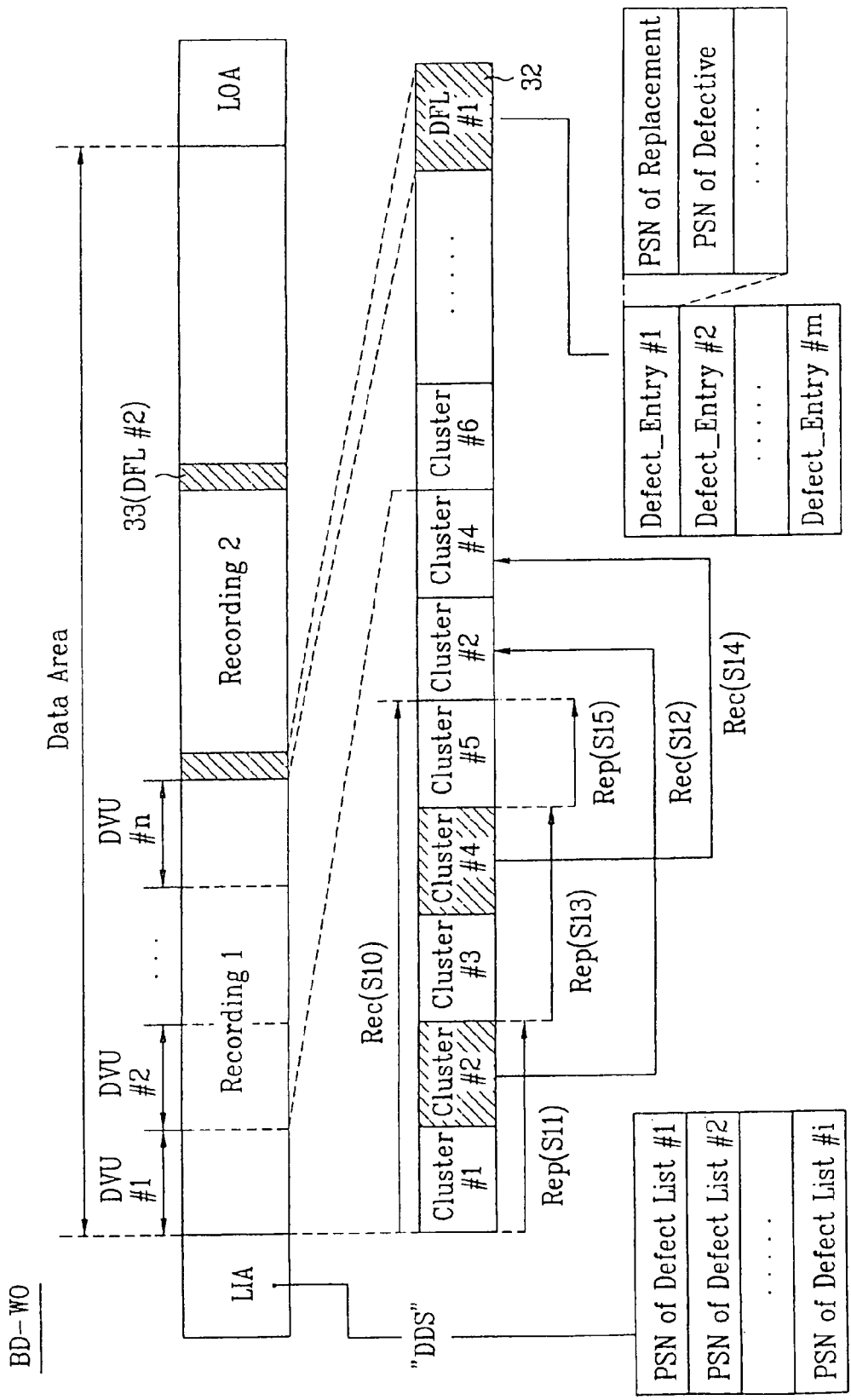
FIG. 5 illustrates a method of managing a defective area on a BD-WO in accordance with a first preferred embodiment of the present invention.

FIG. 5 illustrates a method for managing a defective area on a BD-WO in accordance with a first preferred embodiment of the present invention.

Referring to FIGS. 3 and 5, the method of managing a defective area of a write-once optical disc according to the first embodiment of the present invention is as follows. The optical disc recording/reproducing device 20 writes data continuously on a predetermined writing sector in the data area of the BD-WO, where a writing sector may be set to be a Defect Verify Unit (DVU) of a certain recording size equivalent to one or more than one physical track or cluster on the BD-WO.

After continuously writing the data on the DVUs for a set of data (Recording 1), the microcomputer 26 controls the pickup 22 to conduct a series of defective area detecting operations on the Recording 1 area of the BD-WO. A defective area detecting operation involves reproducing the data written in a DVU and verifying that the data was properly written on the DVU by, e.g., comparing the actual data reproduced from the DVU with the data that was meant to be written on the DVU. If the verification result indicates that certain data was not properly recorded on a DVU, then the recording/reproducing device 20 assumes that there is a defective area in that DVU of the BD-WO and rewrites the data (directed to the defective DVU) on a next available recording area on the BD-WO using a linear replacement scheme.

For example, after writing first to fifth clusters of data (Clusters #1~#5) continuously as a first defect verify unit DVU #1 (step S10), the microcomputer 26 controls the pickup 22 to reproduce the data written on DVU #1 progressively (e.g., cluster by cluster), and detects if there is any defective area in DVU #1 by examining the reproduced data. If, for example, a defective area is detected in the second cluster Cluster #2 (step S11), the microcomputer 26 controls the data processor 24 and the pickup 22 to carry out a replacement writing operation. In the replacement writing operation, the data written to Cluster #2, which are temporarily stored in the memory 27 or some other storage, are written onto a cluster area succeeding the fifth cluster Cluster #5 (step S12).

After the replacement writing for Cluster #2 is completed, the recording/reproducing device 20 checks the next cluster and so on until the last cluster in that DVU is checked. If, for example, a defective area is detected from the fourth cluster Cluster #4 (S13), the recording/reproducing device 20 carries out a replacement writing operation as discussed above to write the data written in the defective Cluster #4 onto a next available cluster area, e.g., a cluster area succeeding the replacement area for Cluster #2 (step S14).

The replacement writing operations continue until data on all the defective clusters in the DVU are written in other cluster areas (replacement areas). As a result, in this example, DVU #1 ends up having Clusters #1, #3, and #5 and two defective areas (original Clusters #2 and #4), where the replacement areas are used to write data thereon in lieu of the two defective areas using a linear replacement scheme.

Once the data recording (Recording 1) having a temporal continuity ends (which includes the defective area detection operations and replacement writing operations for DVU #1, DVU #2, . . ., DVU #n), the microcomputer 26 writes management information onto an area 32 following the last DVU of Recording 1.

The management information is used to manage the defective areas in the data area of the BD-WO and to manage the data written in the replacement areas corresponding to the defective areas. The management information may be managed as Defect List (DFL) information, wherein the DFL information may include one or a plurality of defect entries Defect_Entry #1-Defect_Entry #m, each defect entry having a first physical sector number of a corresponding defective area (PSN of Defective), a first physical sector number of a replacement area corresponding to that defective area (PSN of Replacement), and any other data pertaining to a defect entry.

Once the writing of the DFL information (e.g., DFL #1) for Recording 1 is completed, the recording/reproducing device 20 may continue with another data writing operation (e.g., Recording 2) having a temporal continuity. When the data writing operation (Recording 2) ends (which includes the defective area detecting operations and the replacement writing operations for all the DVUs of Recording 2 as discussed above), the management information for Recording 2 is written in an area 33 following the last DVU in Recording 2. This process is repeated as long as all the data to be written in the data area of the BD-WO are properly written.

For fast access to the management information written thus far, the microcomputer 26 may be configured to write fast access information in other parts of the BD-WO. For instance, the fast access information containing a physical sector number of the defect list written thereon (PSN of Defect List) may be written on the LIA of the BD-WO as Disc Definition Structure (DDS) information. That is, the physical sector number of the DFL #1 (area 32), the physical sector number of the DFL #2 (area 33), and so on are stored in the LIA as part of the DDS. In the alternative, once all the defect lists (e.g., DFL #1-DFL #i) are written scattered throughout the data area of the BD-WO according to the data writing operations, the location information (e.g., physical sector number) of these defect lists may be stored in the LIA as part of the DDS. According to these configurations, during a data reproducing operation, a recording/reproducing device can read and refer to the DDS information written in the LIA to locate where the DFLs are located in the data area of the BD-WO. Then the DFLs can be searched to locate and reproduce data written in a replacement area corresponding to a desired area that is defective.

As shown in FIG. 5, in the first embodiment, there is no pre-assigned spare area in the data area of the BD-WO. DFLs as stored are scattered throughout the data area as the recording operations progress.

Figure 6A:
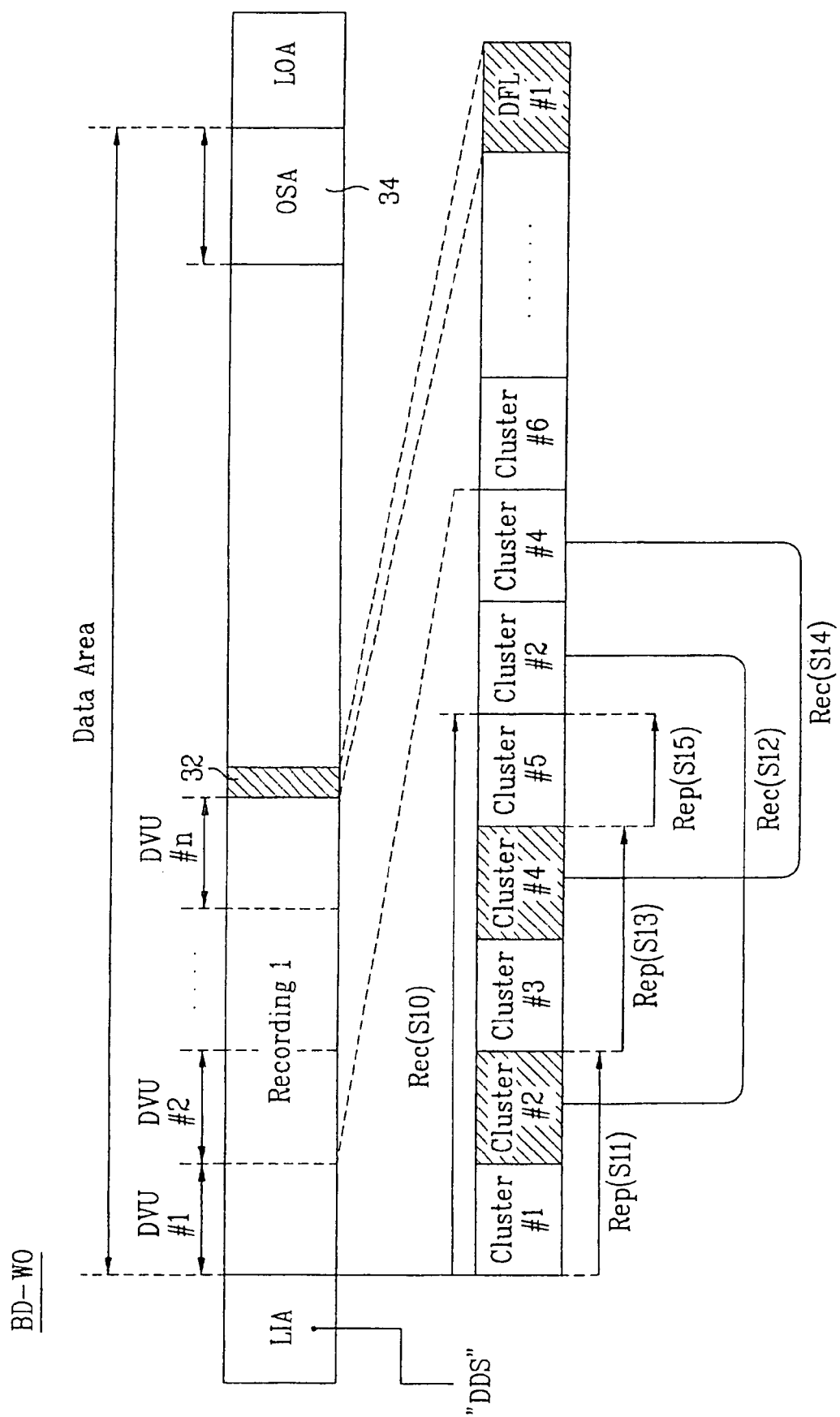
FIGS. 6A and 6B illustrate the method of managing a defective area on a BD-WO in accordance with a variation of the first preferred embodiment of the present invention.
Figure 6B:
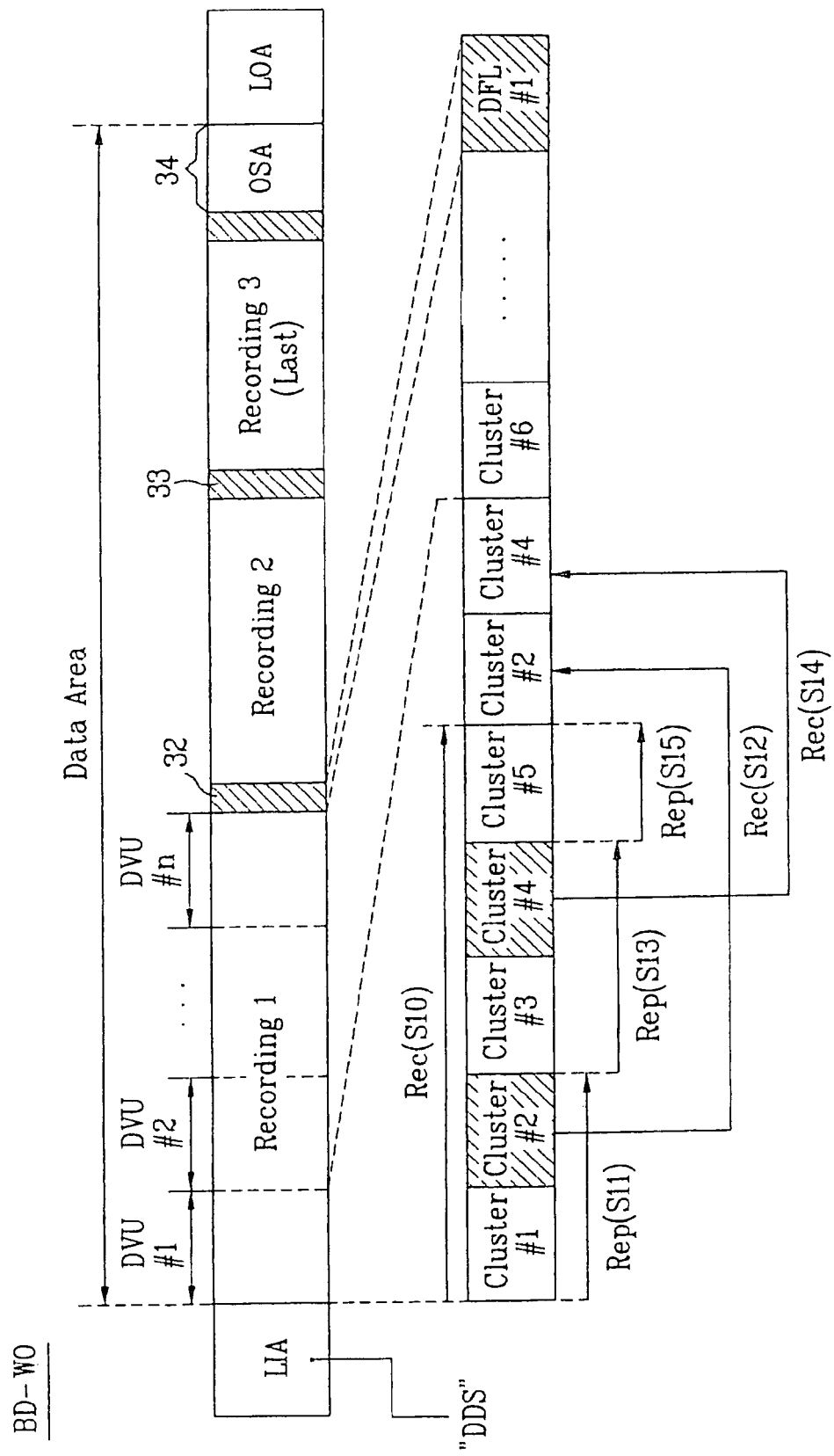

FIGS. 6A and 6B illustrate the method for managing a defective area on a BD-WO in accordance with a variation of the first preferred embodiment of the present invention. This variation of the first embodiment is identical to the above discussed first embodiment (FIG. 5), except that the BD-WO includes a spare area of a fixed size assigned initially to a front part (ISA) or rear end part of the data area, e.g., during the disc production. In this example, an Outer Spare Area 34 (OSA) assigned to the rear end part of the data area is shown.

In this variation, the spare area (e.g., OSA 34) has a fixed size initially, but is variable depending on the need to use the spare area during a data writing/recording operation. For instance, as defects in the data area increase, the size of the assigned spare area may be decreased because the writing of data in the data writing operation(s) is pushed into the spare area, thereby reducing the size of the spare area. That is, in this variation of the first embodiment, the spare area is assigned and used as a designated extra space for the data writing operations, and not necessarily as a replacement area onto which data of the defective area may be written using a linear replacement scheme.

For instance, as shown in FIGS. 6A and 6B, the recording size of the data area (excluding the OSA 34) is reduced according to the recording size of replacement areas (e.g., the size of replacement Clusters #2 and #4) and the size of DFLs as the defective area detecting operation and replacement writing operation are progressed. In this aspect, if the final written location of the data in the user data (excluding the OSA 34) does not protrude into the starting written location of the OSA 34 assigned at the initial stage of disc production, the recording size of the data area (excluding the OSA 34) is maintained as it is. But if the final written location of the data in the user data exceeds the starting written location of the OSA 34 assigned at the initial stage of disc production, the recording size of the user data (excluding the OSA 34) will be increased and the size of the OSA 34 will be decreased accordingly.

Thus, by assigning and using the OSA 34 having a variably reducible recording size, the recording/reproducing device 20 can minimize any error between a writable data capacity detected before starting a data writing operation and the actual writable data capacity reduced due to the presence of any defective area in the data area of the disc.

Figure 7:
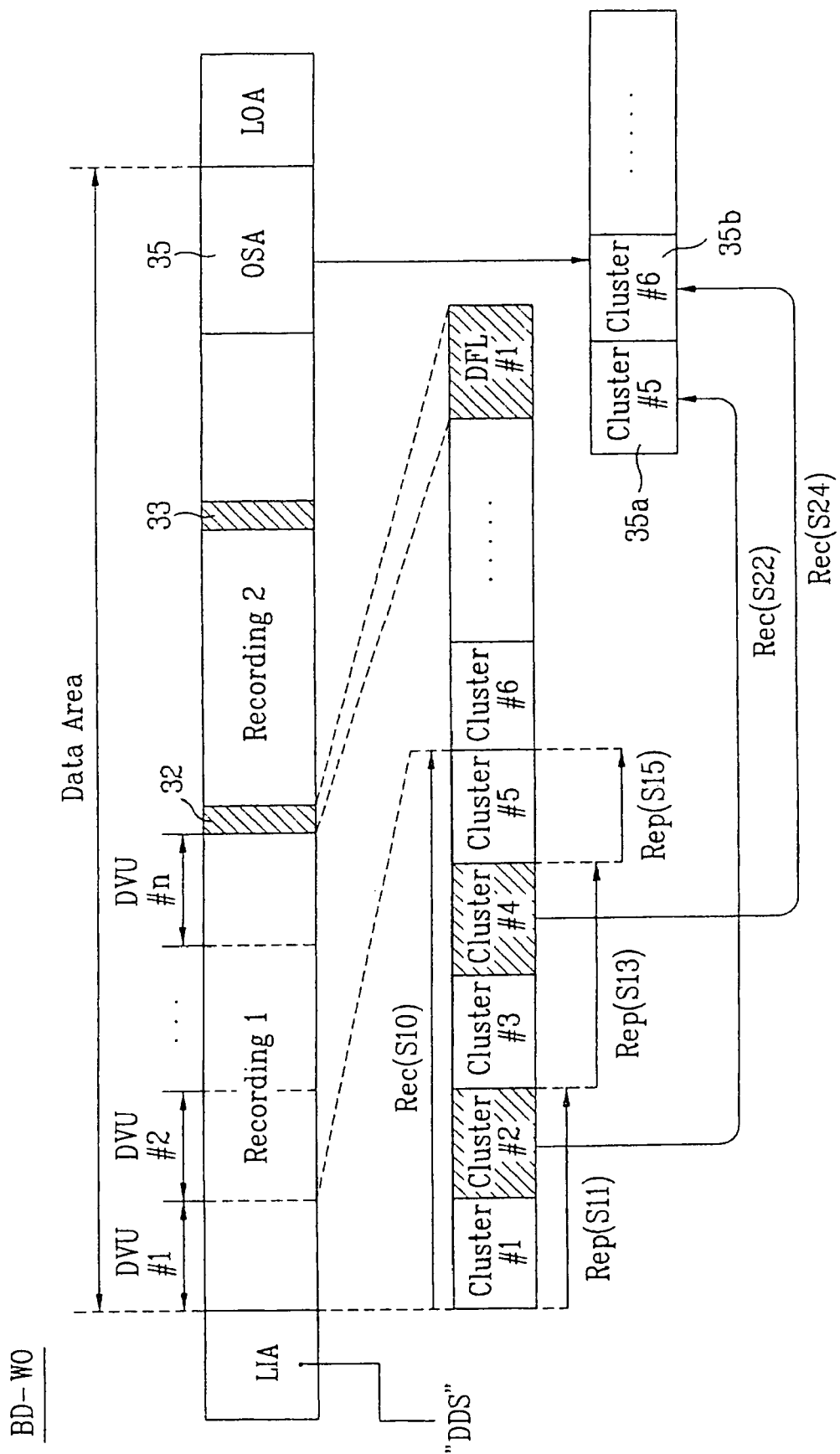
FIG. 7 illustrates a method of managing a defective area on a BD-WO in accordance with a second preferred embodiment of the present invention.

FIG. 7 illustrates a diagram showing a method for managing a defective area on a BD-WO in accordance with a second preferred embodiment of the present invention. In the second embodiment, the BD-WO includes a spare area assigned to a front part (Inner Spare Area ISA) and/or to a rear end part (Outer Spare Area OSA) of the data area. In FIG. 7, the Outer Spare Area 35 (OSA) is shown. The spare area (e.g., OSA 35) in the second embodiment is different from the spare area (e.g., OSA 34) in the first embodiment, because the spare area in the second embodiment is used as a replacement area for writing data corresponding to a defective area using a linear replacement scheme. The spare area in the second embodiment has a variable size, but can have a fixed size if desired.

Referring to FIG. 7, the recording/reproducing device 20 carries out a replacement writing operation wherein, after writing first to fifth clusters of data (Clusters #1~#5) in succession as a first defect verify unit DVU #1 (step S10), the defective area detecting operation and the replacement writing operation are performed. If a defective area from the second cluster area (Cluster #2) is found, then the data of the second cluster is also written in an area 35a of the OSA 35 (step S22) according to a linear replacement scheme. Subsequently, if a defective area from the fourth cluster (Cluster #4) is found, then the data of the fourth cluster is written in an area 35b of the OSA 35 (step S24) according to a linear replacement scheme. Any data on a defective area discovered in each of DVUs is rewritten in a corresponding area of the spare area such as the OSA 35 using the linear replacement scheme.

As a result, in this example, the first defect verify unit DVU# 1 has first, third, and fifth clusters (Clusters #1, #3, and #5) written normally therein and two defective areas (Clusters #2 and #4). The OSA 35 has the replacement areas 35a and 35b for storing therein data equal to the data of defective Clusters #2 and #4.

As in the first embodiment, the second embodiment of the invention writes the management information scattered throughout the data area of the disc once each data recording (e.g., Recording 1, Recording 2, etc.) with a temporal continuity ends. For instance, the recording/reproducing device 20 writes DFL information (i.e., DFL #1) as the management information onto an area 32 following the last DVU of Recording 1. The operation of writing management information (e.g., DFLs) and the operation of writing DDS (e.g., for fast access) are the same as those discussed in the first embodiment of the invention.

Figure 8:
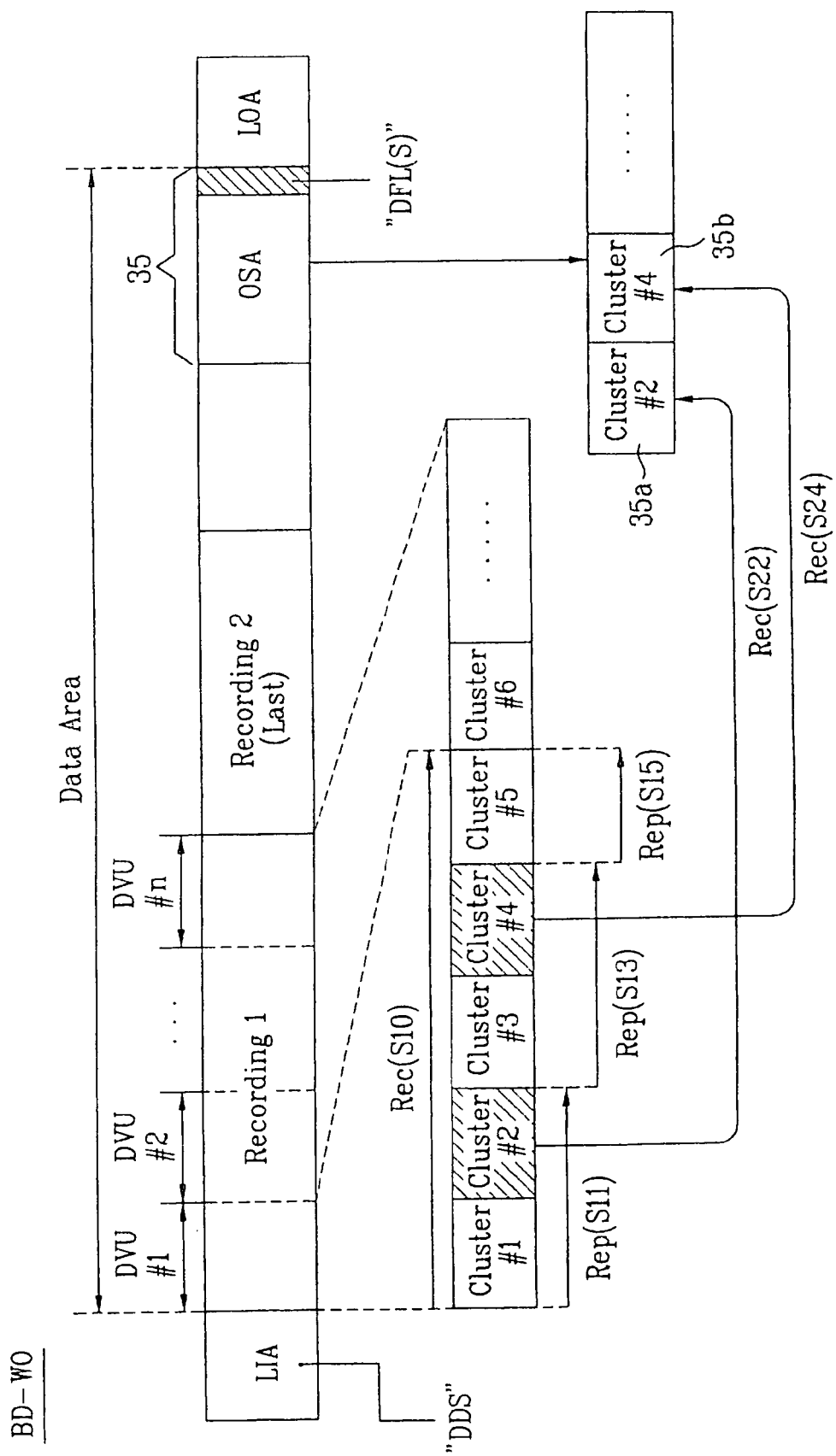
FIG. 8 illustrates a method of managing a defective area on a BD-WO in accordance with a third preferred embodiment of the present invention.

FIG. 8 illustrates a diagram showing a method for managing a defective area on a BD-WO in accordance with a third preferred embodiment of the present invention. The third embodiment is identical to the second embodiment of the invention, except that the DFLs (management information) are not stored as scattered throughout the data area, but instead, the DFL(s) are stored within an assigned spare area such as an ISA or OSA.

As shown in FIG. 8, for example, after each data recording (e.g., Recording 1) with a temporal continuity ends, the recording/reproducing device 20 writes a DFL corresponding to just ended data recording, within the OSA 35. Thus, all the DFLs corresponding to different Recordings 1, 2, ... are stored in an area of the OSA 35. In addition, the OSA 35 functions as replacement areas for storing data identical to the data of any defective area in the data area. Having the DFLs within one area such as the OSA 35 and having the replacement areas all within the OSA 35 can expedite the process of locating desired replacement areas using the DDS and DFLs.

Figure 9:
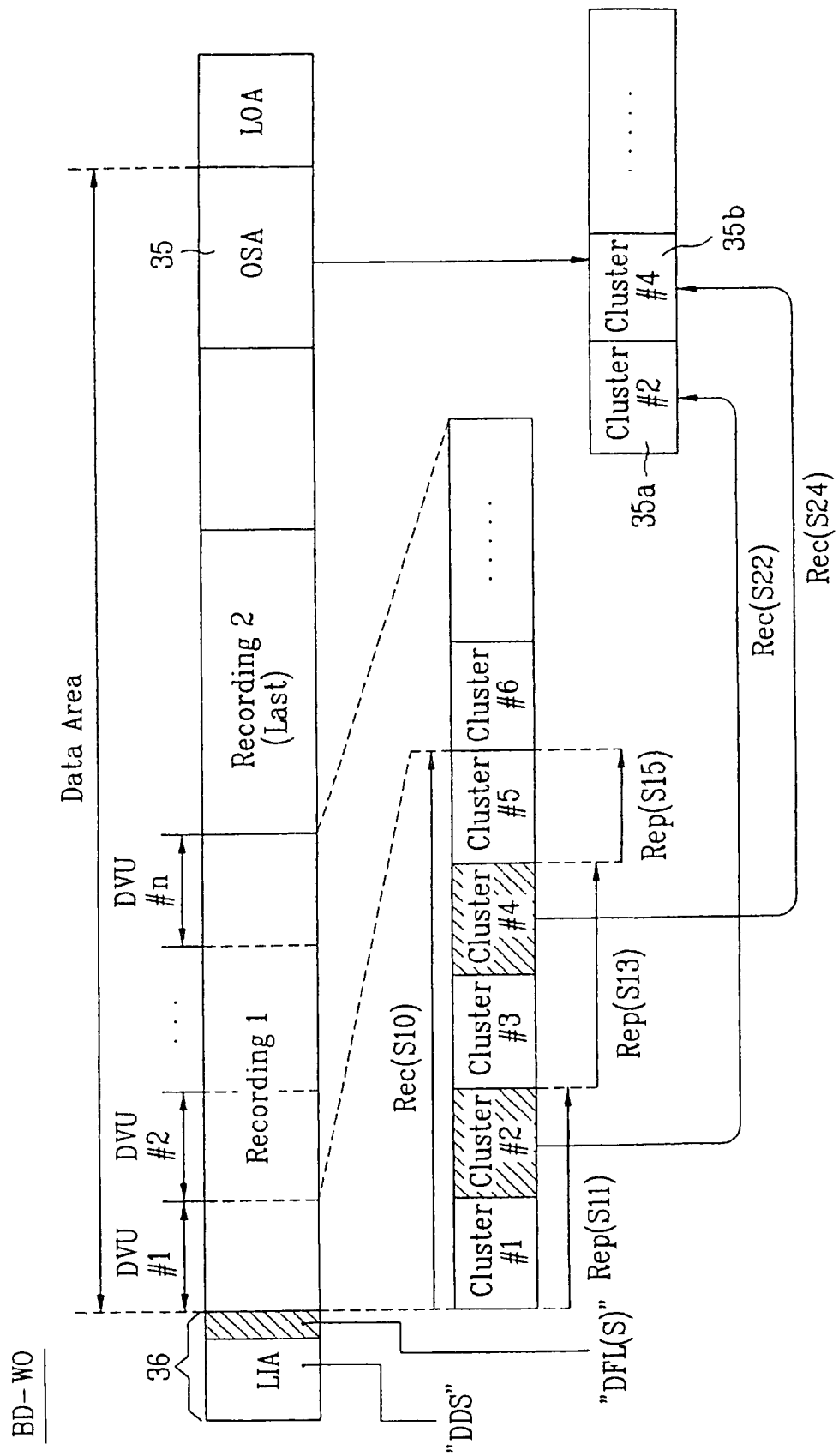
FIG. 9 illustrates a method of managing a defective area on a BD-WO in accordance with a fourth preferred embodiment of the present invention.

FIG. 9 illustrates a diagram showing a method for managing a defective area on a BD-WO in accordance with a fourth preferred embodiment of the present invention. The fourth embodiment is identical to the third embodiment of the invention, except that the DFLs (management information) are written in a particular writing sector outside of the data area, for example, in the lead-in area LIA.

As shown in FIG. 9, for example, after each data recording (e.g., Recording 1) with a temporal continuity ends, the recording/reproducing device 20 writes a DFL corresponding to just ended data recording, within the LIA 36. Thus, all the DFLs corresponding to different Recordings 1, 2, ... are stored in the LIA 36. In addition to the DFLs, the LIA 36 stores therein the DDS discussed in the previous embodiments. The OSA 35 still functions as replacement areas for storing data identical to the data of any defective area in the data area. Having the DFLs within one area such as the LIA 36, having the replacement areas all within the OSA 35, and/or having both the DDS and DFLs within one area such as the LIA 36 expedites the process of defect management and the process of locating desired replacement areas using the DDS and DFLs.

Figure 10A:
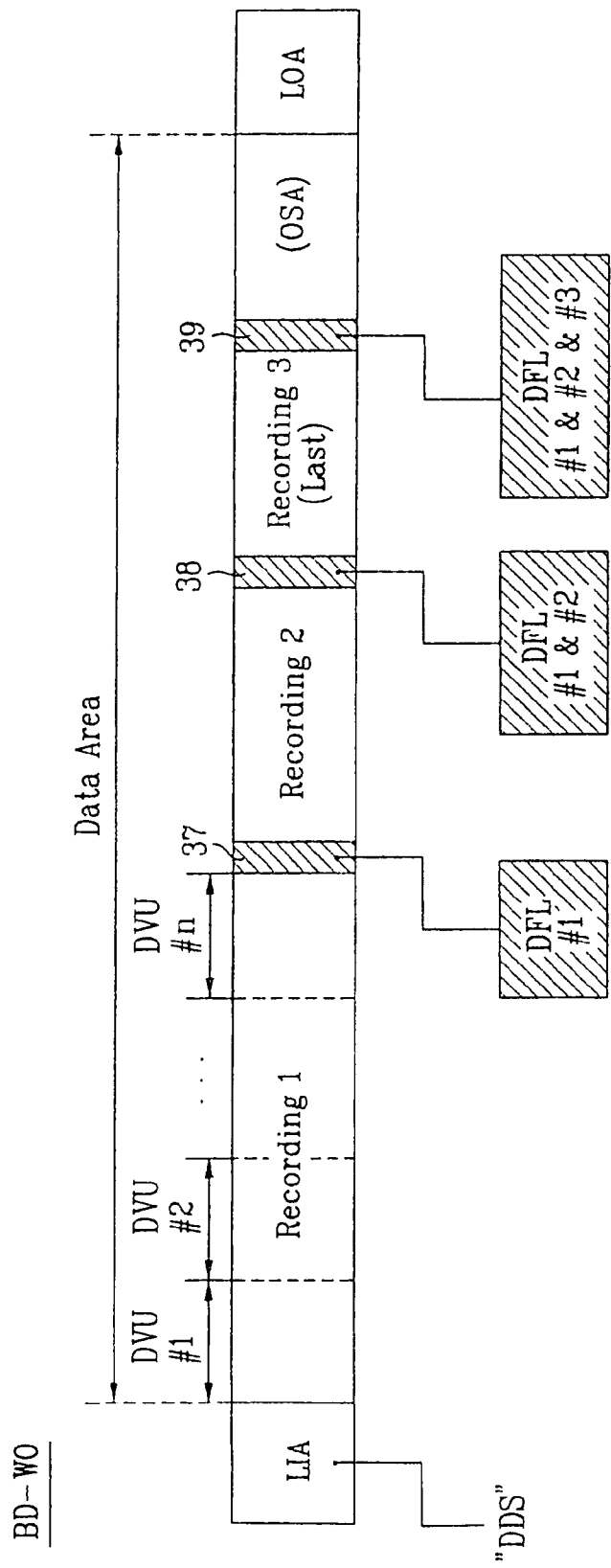
FIGS. 10A, 10B and 10C illustrate a method of managing a defective area on a BD-WO in accordance with various examples of a fifth preferred embodiment of the present invention.
Figure 10B:
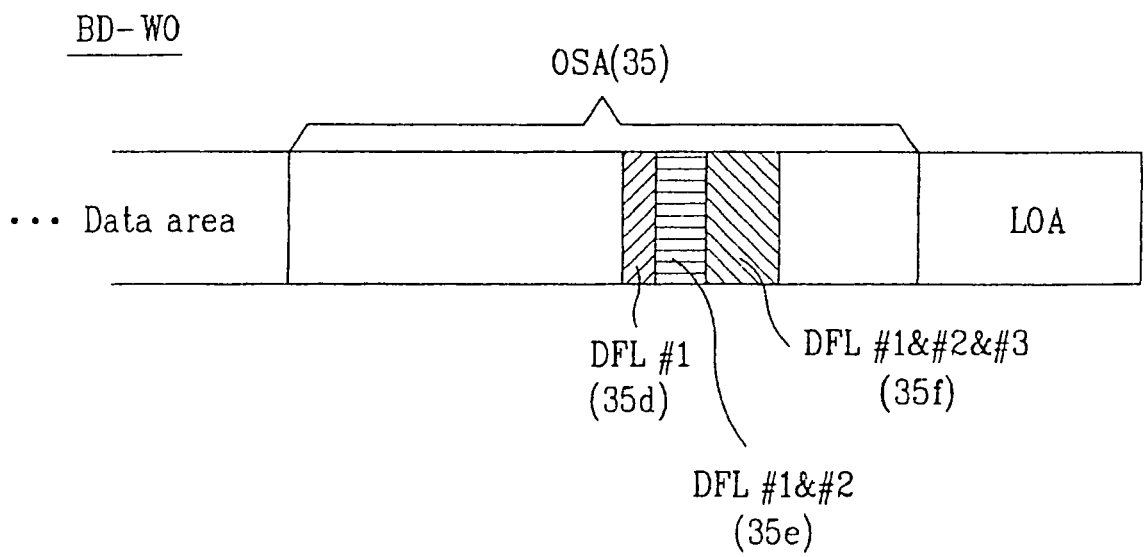
Figure 10C:
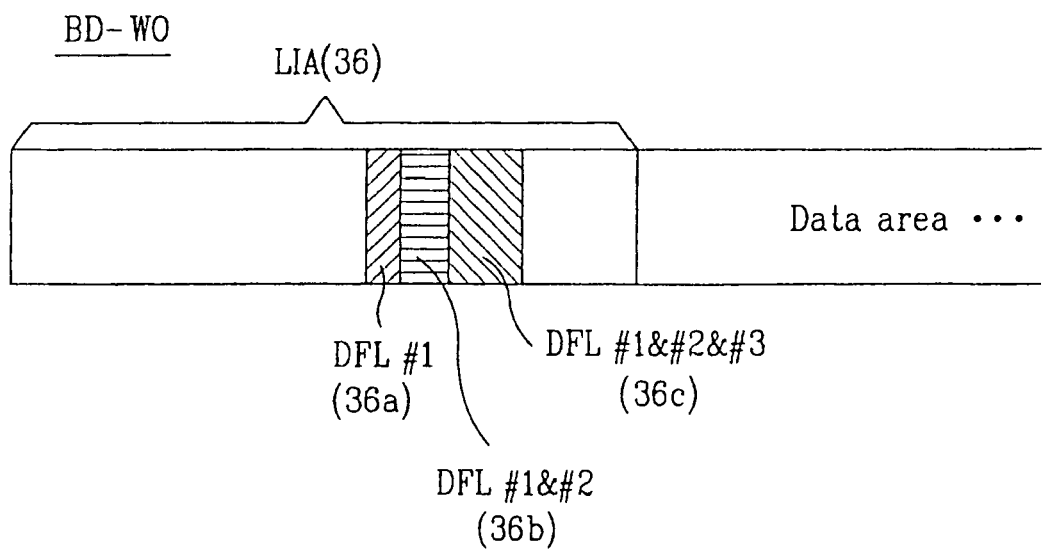

FIGS. 10A, 10B and 10C are examples for illustrating a method for managing a defective area on a BD-WO according to a fifth preferred embodiment of the present invention. The fifth embodiment differs from the previous embodiments in that it allows a cumulative writing of DFLs. This cumulative writing of DFLs is applicable to each of the first through fourth embodiments previously discussed.

As an example, according to the fifth embodiment, FIG. 10A shows how the cumulative writing of DFLs is applied to the first and second embodiments shown in FIGS. 5-7. Referring to FIG. 10A, when a first data writing operation (e.g., Recording 1) having a temporal continuity ends, the recording/reproducing device 20 writes a DFL (DFL #1) corresponding to the just ended, first writing operation onto a first DFL area 37 of the data area. As discussed in the first and second embodiments, the first DFL area 37 follows immediately the last DVU of the first recording area (an area of Recording 1). Then the recording/reproducing device 20 proceeds with a second data writing operation (i.e., Recording 2). After the second data writing operation ends, the recording/reproducing device 20 writes a DFL (DFL #2) corresponding to the second writing operation along with the first DFL (DFL #1) onto a DFL area 38 of the data area. The second DFL area 38 follows immediately the last DVU of the second recording area (area of Recording 2). Then the recording/reproducing device 20 proceeds with a third data writing operation (i.e., Recording 3). After the third data writing operation ends, the recording/reproducing device 20 writes a DFL (DFL #3) corresponding to the third writing operation along with the first and second DFLs (DFLs #1 and #2) onto a third DFL area 39 of the data area. The third DFL area 39 follows immediately the last DVU of the third recording area (area of Recording 3). This process continues for any subsequent data writing operation. Accordingly, the DFLs are cumulatively written within the data area as the data writing operations continue.

As another example, according to the fifth embodiment, FIG. 10B shows how the cumulative writing of DFLs is applied to the third embodiment shown in FIG. 8 where the DFLs are written within a spare area such as the OSA 35. Referring to FIG. 10B, when a first data writing operation (e.g., Recording 1) having a temporal continuity ends, the recording/reproducing device 20 writes a DFL (DFL #1) corresponding to the just ended, first writing operation onto a DFL area 35*d* of the OSA 35. Then the recording/reproducing device 20 proceeds with a second data writing operation (i.e., Recording 2). After the second data writing operation ends, the recording/reproducing device 20 writes a DFL (DFL #2) corresponding to the second writing operation along with the first DFL (DFL #1) onto a second DFL area 35*e* of the OSA 35. In this example, the second DFL area 35*e* is immediately adjacent to the first DFL area 35*d*. Then the recording/reproducing device 20 proceeds with a third data writing operation (i.e., Recording 3). After the third data writing operation ends, the recording/reproducing device 20 writes a DFL (DFL #3) corresponding to the third writing operation along with the first and second DFLs (DFLs #1 and #2) onto a third DFL area 35*f* of the OSA 35. In this example, the third DFL area 35*f* follows immediately the second DFL area 35*e*. This process continues for any subsequent data writing operation. Accordingly, the DFLs are cumulatively written within the spare area of the data area as the data writing operations continue.

As still another example, according to the fifth embodiment, FIG. 10C shows how the cumulative writing of DFLs is applied to the fourth embodiment shown in FIG. 9 where the DFLs are written within an area outside of the data area, e.g., a lead-in area LIA 36. Referring to FIG. 10C, when a first data writing operation (e.g., Recording 1) having a temporal continuity ends, the recording/reproducing device 20 writes a DFL (DFL #1) corresponding to the first writing operation onto a DFL area 36*a* of the LIA 36. Then the recording/reproducing device 20 proceeds with a second data writing operation (i.e., Recording 2). After the second data writing operation ends, the recording/reproducing device 20 writes a DFL (DFL #2) corresponding to the second writing operation along with the first DFL (DFL #1) onto a second DFL area 36*b* of the LIA 36. In this example, the second DFL area 36*b* is immediately adjacent to the first DFL area 36*a*. Then the recording/reproducing device 20 proceeds with a third data writing operation (i.e., Recording 3). After the third data writing operation ends, the recording/reproducing device 20 writes a DFL (DFL #3) corresponding to the third writing operation along with the first and second DFLs (DFLs #1 and #2) onto a third DFL area 36c of the LIA 36. In this example, the third DFL area 36*c* follows immediately the second DFL area 36*b*. This process continues for any subsequent data writing operation. Accordingly, the DFLs are cumulatively written within an area before/after the data area, such as a lead-in area as the data writing operations continue.

In the fifth embodiment, by accessing the last DFL area of a data area, a spare area or a lead-in area, the DFLs associated with all the data writing operations can be advantageously and immediately accessed. Therefore, even when the first defect list information (DFL #1) written at the time the first data writing operation (Recording 1) is not read properly, DFL #1 information can be accessed by reading any subsequent DFL information. This prevents or minimizes an occurrence of reproduction errors which may be caused by a damage to any defect list.

The application of the method for cumulative writing and managing the defect list information may be extended to other embodiments for writing and managing defect list information in addition to the foregoing various embodiments described with reference to FIGS. 3 to 9.

In the present invention, the data reproducing operation can occur currently, subsequently or prior to the data writing operation. The data writing operation can occur currently, subsequently or prior to the defect detecting operation and/or data replacement writing operation and/or the management information writing operation.

As has been described, the method and apparatus for managing a defective area on an optical disc of write once type according to the present invention read and reproduce properly a data written on a defective area of an optical disc such as BD-WO in a data reproduction by writing the data onto a spare area or other data area in place of the defective area and by managing the data associated with the defective area and the defect management data effectively. The invention also minimizes an error between a writable data capacity of a recording medium detected before starting the data writing operation and the actual writable data capacity of the recording medium reduced due to the defective area, and minimizes any occurrence of reproduction errors which may be caused by a damage to a defect list.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for managing a defective area on a recording medium of writable once type, the recording medium having a recording layer including a lead-in area, a data area and a lead-out area, the data area including a spare area being used for a replacement writing operation, the method comprising:
   detecting an existence of a defective area within the data area of the recording medium;
   replacing the defective area with a replacement area in the spare area if the defective area is detected;
   writing, in at least one defect management area within the spare area, defect management information which cumulatively includes defect list information associated with the detected defective area and any previous defect list information previously written in the recording medium, the defect management area being allocated to the spare area when a plurality of defect management areas are provided; and
   writing positional information onto the defect management area, the positional information including information for indicating a position of a latest defect management information written in the defect management area.

2. The method as claimed in claim 1, further comprising:
   writing data onto a recording area of the data area during a data writing operation, the data being written to a plurality of clusters of the recording area; and
   wherein the detecting step includes, for each of the plurality of clusters, examining data written therein and determining whether each of the plurality of clusters is defective based on a corresponding examination result.

3. The method as claimed in claim 1, wherein the replacing step includes:
   writing data corresponding to the defective area onto a replacement cluster of the spare area.

4. The method as claimed in claim 3, further comprising:
   after the writing step is completed for the data writing operation, writing defect list information associated with the defective area onto the spare area.

5. The method as claimed in claim 1, wherein the spare area is either an inner spare area located at a front part of the data area, or an outer spare area located at a rear end of the data area.

6. The method as claimed in claim 1, wherein the defect list information includes positional information on the defective area and positional information on the replacement area of the spare area used in the writing step.

7. The method as claimed in claim 1, wherein the positional information includes location information of respective defect list information included in the defect management information.

8. A non-transitory computer-readable recording medium of writable once type, comprising:
   a recording layer including a lead-in area, a data area and a lead-out area,
   a spare area allocated on at least one of an inner portion and an outer portion of the data area, the spare area being used for replacing a defective area existing on the data area,
   a defect management area allocated on a part of the spare area storing therein defect management information which cumulatively includes new defect list information associated with the defective area detected during a data writing operation and previous defect list information previously written in the computer-readable recording medium, the defect management area being allocated to the spare area when a plurality of defect management areas are provided; and
   a positional information in the defect management area, the positional information including information for indicating a position of a latest defect management information written in the defect management area.

9. The non-transitory computer-readable recording medium as claimed in claim 8, wherein the positional information includes location information of respective defect list information included in the defect management information.

10. An apparatus for managing a defective area on a recording medium of writable once type, the recording medium having a recording layer including a lead-in area, a data area and a lead-out area, the data area including a spare area being used for a replacement writing operation, the apparatus comprising:
    an optical pickup configured to write data to or read data from the recording medium;
    a servo unit configured to control the optical pickup to maintain a distance between the optical pickup and the recording medium and track relevant tracks on the recording medium; and
    a controller configured to
       control the servo unit and the optical pickup to detect an existence of a defective area within the data area of the recording medium;
       replace the defective area with a replacement area in the spare area if the defective area is detected;
       write in at least one defect management area within the spare area defect management information which cumulatively includes new defect list information associated with the defective area and previous defect list information previously recorded in the recording medium, the defect management area being allocated to the spare area when a plurality of defect management areas are provided; and control the optical pickup to write positional information onto the defect management area, the positional information including information for indicating a position of a latest defect management information written in the defect management area.

11. The apparatus as claimed in claim 10, wherein the controller is configured to
control the optical pickup to write data onto a recording area of the data area during a data writing operation, the data being written to a plurality of clusters of the recording area; and
for each of the plurality of clusters, examine data written therein and determine whether each of the plurality of clusters is defective based on a corresponding examination result.

12. The apparatus as claimed in claim 10, wherein the controller is configured to replace the defective area by controlling the optical pickup to write, onto a replacement cluster of the spare area, data corresponding to the defective area.

13. The apparatus as claimed in claim 11, wherein the controller is configured to control the optical pickup to write onto the spare area defect list information associated with the defective area.

14. The apparatus as claimed in claim 10, wherein the spare area is either an inner spare area located at a front part of the data area, or an outer spare area located at a rear end of the data area.

15. The apparatus as claimed in claim 10, wherein the controller is configured to control the optical pickup to write location information of respective defect list information included in the defect management information as the positional information.

16. The apparatus as claimed in claim 10, wherein the controller is configured to control the optical pickup to write the defect management information so that the spare area includes previous defect management information and the defect management information, the previous defect management information including the previous defect list information, the defect management information including the previous defect list information and the new defect list information.

17. The method as claimed in claim 1, wherein the positional information is cumulative positional information including information for indicating a position of a first defect management information written in the defect management area in addition to the information for indicating the position of the last defect management information written in the defect management area.

18. The non-transitory computer-readable recording medium as claimed in claim 8, wherein the positional information is cumulative positional information including information for indicating a position of a first defect management information written in the defect management area in addition to the information for indicating the position of the last defect management information written in the defect management area.

19. The apparatus as claimed in claim 10, wherein the positional information is cumulative positional information including information for indicating a position of a first defect management information written in the defect management area in addition to the information for indicating the position of the last defect management information written in the defect management area.

* * * * *